United States Patent Office 3,674,426
Patented July 4, 1972

---

3,674,426
PROCESS FOR PRODUCING CRYSTALLINE ZEOLITE A
Tadao Ueda, Kenji Sato, and Yasusi Nakamura, Tokyo, Japan, assignors to Asahidenka Kogyo Kabushiki Kaisha, Tokyo, Japan
No Drawing. Original application Sept. 25, 1967, Ser. No. 670,429, now Patent No. 3,535,075. Divided and this application June 8, 1970, Ser. No. 56,998
Claims priority, application Japan, Sept. 28, 1966, 41/63,892 Sept. 29, 1966, 41/64,255; Dec. 14, 1966, 41/81,553
Int. Cl. C01b 33/28
U.S. Cl. 23—113                          7 Claims

---

ABSTRACT OF THE DISCLOSURE

A process for preparing sodium zeolite A which comprises preparing an aqueous sodium-alumino-silicate reactant mixture consisting essentially of (1) oxides of silicon, aluminum and sodium and (2) water, in the proportion, expressed in terms of oxide mol ratios, falling within the following ranges:

|  | Range 1 | Range 2 | Range 3 | Range 4 |
|---|---|---|---|---|
| $Na_2O/SiO_2$ | 0.4–0.7 | 0.4–0.7 | 0.7–1 | 1–4 |
| $SiO_2/Al_2O_3$ | 1–2 | 1–2.5 | 1–2.5 | 1–2.5 |
| $H_2O/Na_2O$ | 40–100 | 120–300 | 220–300 | 210–300 | wherein the major source of silica in the reactant mixture is Allophane, maintaining the reactant mixture at a temperature within the range of 40° C. to 180° C. for a sufficient period to crystallize sodium zeolite A, and separating the crystals from the mother liquor.

A process for preparing sodium zeolite A which comprises preparing an aqueous sodium-alumino-silicate reactant mixture consisting essentially of (1) oxides of silicon, aluminum and sodium and (2) water, in the proportion, expressed in terms of oxide mol ratios, falling within the following ranges:

|  | Range 1 | Range 2 | Range 3 |
|---|---|---|---|
| $Na_2O/SiO_2$ | 0.4–0.7 | 0.7–1 | 1–4 |
| $SiO_2/Al_2O_3$ | 1–2.5 | 1–2.5 | 1–2.5 |
| $H_2O/Na_2O$ | 120–300 | 220–300 | 210–300 | wherein the major source of silica in the reactant mixture is soluble sodium silicate, maintaining the reactant mixture at a temperature within the range of 40° C. to 180° C. for a sufficient period to crystallize sodium zeolite A, and separating the crystals from the mother liquor.

---

CROSS REFERENCE TO A RELATED APPLICATION

This application is a division of our co-pending application Ser. No. 670,429, filed Sept. 25, 1967, now Pat. No. 3,535,075.

BACKGROUND OF THE INVENTION

Field of the invention

This invention relates to a process for producing synthetic crystalline zeolite of the molecular sieve type. More particularly, the invention relates to a process for synthesizing zeolite A whereby high purity zeolite A is obtained in commercially desirable yields and reaction times.

DESCRIPTION OF THE PRIOR ART

Zeolites are those crystalline metal aluminosilicates having compositions which can be expressed generally by the following formula:

$$M_{\frac{2}{n}}O:Al_2O_3:XSiO_2:YH_2O$$

wherein M represents a metal and n represents its valence.

The crystalline zeolites of the molecular sieve type consist basically of a rigid three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or O/Al—Si)—2. The electro-valence of the tetrahedron containing aluminum is balanced by the inclusion in the crystal of a cation, for example, an alkali or alkaline earth ion. One cation may be exchanged for another by various ion exchange techniques. The spaces between the tetrahedra are occupied by water molecules prior to dehydration or activation of the crystal.

Generally, any particular crystalline zeolite will have values for X and Y, in the above formula, that fall in definite ranges. The value X for a particular zeolite will vary somewhat since the aluminum atoms and the silicon atoms occupy essentially equivalent positions in the crystal lattice.

Zeolite A is a synthetic three-dimensional crystalline zeolite of the molecular sieve type, which is to say that upon activation by the removal of at least part of its water of crystallization, its crystal structure remains intact and is characterized by the possession of internal adsorption areas accessible through openings or pores of definite dimensions. When zeolite A is synthesized from reactant mixtures containing substantial amounts of sodium cations, the sodium form is obtained which when activated, will be particularly useful for the adsorption of molecules having critical dimensions smaller than about four angstrom units while refusing larger size molecules.

Sodium zeolite A is a synthetic rigid three-dimensional crystalline zeolite of the molecular sieve type which may be represented by the formula:

$$1.0\pm0.2Na_2O \cdot A_2O_3 \cdot 1.85\pm0.5SiO_2 \cdot YH_2O$$

wherein Y may have any value from essentially zero up to about 5.1. Sodium zeolite A has an X-ray powder diffraction pattern characterized by at least those reflections set forth in Table A below.

TABLE A
d values of reflection in A

| | |
|---|---|
| 12.2±0.2 | 3.38±0.05 |
| 8.6±0.15 | 3.26±0.05 |
| 7.02±0.15 | 2.96±0.05 |
| 5.45±0.10 | 2.73±0.05 |
| 4.06±0.05 | 2.61±0.05 |
| 3.68±0.05 | |

Sodium zeolite A and its properties are described in detail in U.S. Pat. No. 2,882,243, issued Apr. 14, 1959, to R. M. Milton, and processes for its preparation are described in said U.S. patent and other patents referred to hereinafter.

Various methods are known for preparing crystalline zeolites of the molecular sieve type. In the preparation of sodium zeolite A, it has been found that the composition of the initial reactant mixture is critical as well as the reaction, digestion and crystallization temperatures, duration of the several reaction steps and the selection of the major source of silica.

These methods for preparing crystalline alumino silicate can be largely divided into two groups. In the first group, crystals are crystallized from a fused mixture of reaction materials. In the second group, alumino silicate in crystallized from an aqueous reaction material mixture.

Examples of the methods of the first group are illustrated by U.S. Pat. Nos. 942,535, 1,131,503 and 1,140,263 wherein alumino silicate is crystallized from a fused mixture containing kaolin, quartz or other materials. But there is no evidence that the product of these methods are crystalline zeolites of the molecular sieve type. To the best of applicant's knowledge there is no patent disclosure stating that the above-described crystalline zeolite of the molecular sieve type is produced by the method of the first group. The conventional methods of the second group can be largely divided into (a) a class of methods wherein no natural mineral is used as a main raw material and represented by a method wherein soluble sodium silicate is used for the main silica source and sodium aluminate is used for the alumina source and (b) a class of methods wherein a natural mineral is used as the main raw material as represented by a method wherein a kaolin type mineral is used for the main silica and alumina source. In the class of methods (a), there are methods wherein other silica sources (silica gel) and alumina sources ($\alpha$ alumina and $\gamma$ alumina) are used but these are not completely satisfactory in that gelling or crystallization of the alumino silicate is more difficult. Therefore, they have not been considered to be more practical than the typical example wherein soluble sodium silicate is used. With the methods of Class (b) due to the trouble of the oxide mol ratio of silica to alumina or impurities in the reaction mixture, etc., it has been believed to be difficult to obtain zeolite high in the required purity from materials other than kaolin-type minerals.

In the case of preparing the desired particular crystalline zeolite from an aqueous reaction mixture, as the crystal structure is complicated and special as described above, the preparation is possible only under very limited conditions. Particularly the kinds of the raw material substances, especially the silica source and alumina source and the values of $a$, $b$ and $c$ represented by the following formulas and expressing the compositions in terms of oxide mol ratios of the aqueous raw material mixtures:

$$M_{2/n}O/SiO_2 = a$$
$$SiO_2/Al_2O_3 = b$$
$$H_2O/M_nO = c$$

wherein M is an alkali metal and $n$ is its valency, are essential factors to determine the type of zeolite.

The compositions, in the term of oxide mol ratios, of aqueous reaction material mixtures from which synthetic crystalline zeolite A high in the purity is obtained are as follows. In U.S. Pat. No. 2,882,243, the composition falls within one of the following ranges:

|  | Range 1 | Range 2 |
| --- | --- | --- |
| $Na_2O/SiO_2$ | 1.0–3.0 | 0.8–3.0 |
| $SiO_2/Al_2O_3$ | 0.3–1.3 | 1.3–2.39 |
| $H_2O/Na_2O$ | 33–200 | 34–200 |

Further, in the specification of U.S. Pat. No. 3,114,603, kaolin ($Al_2O_3 \cdot 2SiO_2 \cdot 2H_2O$) is used as a silica and alumina source and the composition is as follows, in terms of oxide mol ratios:

$Na_2O/SiO_2$ ---------------------------- 1.75 to 20
$SiO_2/Al_2O_3$ ---------------------------- 1.2 to 1.4
$H_2O/Na_2O$ ---------------------------- 30 to 100

Thereby zeolite A of a purity of 75 to 92% has been obtained. In the specification of U.S. Pat. No. 3,101,251, perlite (of the general formula of $$0.54Na_2O \cdot 0.50K_2O_3 \cdot Al_2O_3 \cdot 128SiO_2 \cdot 2H_2O)$$

or cyanite ($Al_2O_3 \cdot 1.69SiO_2 \cdot 0.01Fe_2O_3 \cdot 0.11H_2O$) is used as a silica source and alumina source and its composition in terms of oxide mol ratios is as follows:

$Na_2O/SiO_2$ ---------------------------- 1.3 to 2.5
$SiO_2/Al_2O_3$ ---------------------------- 0.8 to 3.0
$H_2O/Na_2O$ ---------------------------- 35 to 200

Thereby zeolite A of a purity of 76 to 87% has been obtained. In the specification of U.S. Pat. No. 3,119,660, source and the composition, in terms of oxide mol ratios, reactive kaolin is used as a silica source and alumina is as follows:

$Na_2O/SiO_2$ ---------------------------- 0.7 to 1.2
$SiO_2/Al_2O_3$ ---------------------------- 2
$H_2O/Na_2O$ ---------------------------- 10 to 50

Thereby zeolite of a purity of 90 to 100% has been obtained. Further, in the specification of Belgian Pat. No. 620,278, kaolinite ($Al_2O_3 \cdot 2SiO_2 \cdot 2H_2O$) or halloysite ($Al_2O_3 \cdot 2SiO_2 \cdot 2H_2O$) is used as a silica source and alumina source and the composition, in terms of oxide mol ratios, is as follows:

$Na_2O/SiO_2$ ---------------------------- 1.2 to 1.4
$SoO_2/Al_2O_3$ ---------------------------- 1.75 to 2
$H_2O/Na_2O$ ---------------------------- 3.0 to 100

Thereby zeolite A of a purity of 93 to 96% has been obtained. In the specification of Japanese patent publication No. 21,131/1965, amorphous sodium alumino silicate is used as the main raw material and the composition, in terms of oxide mol ratios, is as follows:

$Na_2O/SiO_2$ ---------------------------- 0.8 to 3.0
$SiO_2/Al_2O_3$ ---------------------------- 0.5 to 2.5
$H_2O/Na_2O$ ---------------------------- 35 to 200

Summarizing the above, in the methods shown in the above six patents, the compositions of the aqueous reaction material mixtures, in terms of oxide mol ratios, are $SiO_2/Al_2O_3$, 0.7 to 3.0, $SiO_2/Al_2O_3$, 0.5 to 3.0 and $H_2O/Na_2O$, 10 to 200. In other words, from any reaction mixtures having compositions falling in the range wherein $SiO_2/Al_2O_3$ is not more than 3 and $Na_2O/SiO_2$ is less than 0.7 or $H_2O/SiO_2$ is not less than 200, no pure zeolite A was obtained. Further, it is mentioned in the above-described U.S. Pat. No. 3,101,251 that, in case nonreactive kaolin is used as a silica and alumina source, in the range above, only sodalite $$(Na_2O \cdot Al_2O_3 \cdot 2SiO_2 \cdot 2NaOH \cdot H_2O)$$

which has no adsorbing characteristic like zeolite will be obtained as crystals. Further, it is mentioned in the above-described U.S. Pat. No. 3,114,603 that the purity of zeolite A obtained in the reaction in a single step (aging) cannot exceed 79% and that it is difficult to increase the purity.

Further, in the above-described Belgian Pat. No. 620,278, it is mentioned that, in case deikite $$(Al_2O_3 \cdot 2SiO_2 \cdot 2H_2O)$$

is used as a silica and alumina source, the purity of zeolite A will not exceed 53%. It is also mentioned in the specification of Japanese patent publication No. 6,713/1957 that, in case the composition, in the terms of oxide mol ratios of the reaction material, aqueous mixtures fall within one of the following ranges:

$Na_2O/SiO_2$ ---------------------------- 0.7 to 3.0
$SiO_2/Al_2O_3$ ---------------------------- 0.06 to 3.4
$H_2O/Na_2O$ ---------------------------- 4 to 35 pure zeolite A cannot be obtained but only a mixture with other crystals will be obtained. That is to say, it is taught that, even from the aqueous reaction material mixtures having the compositions falling in or very near the following ranges in terms of oxide mol ratios:

$Na_2O/SiO_2$ ---------------------------- 0.7 to 3.0
$SiO_2/Al_2O_3$ ---------------------------- 0.5 to 25
$H_2O/Na_2O$ ---------------------------- 10 to 200 zeolite A of a high purity will not always be obtainable. This is evidence that it is very difficult to set or to select the conditions of the reaction, the kinds of the raw materials and the composition of the aqueous raw material mixture for obtaining pure zeolite A.

In the specification of Japanese patent publication No. 19,116/1961, the exceptional method is disclosed wherein silica sol is used as a silica source and the aqueous reaction material mixture has a composition, in terms of oxide mol ratios, falling within the following range:

$Na_2O/SiO_2$ ---- 0.3 to 1.0
$SiO_2/Al_2O_3$ ---- 4 to 6
$H_2O/Na_2O_3$ ---- 130 to 300

However, from the reaction material mixture having the mol ratio of $SiO_2/Al_2O_3$ of not less than 3.0, zeolite X was obtained in most cases. For example, in the specification of Japanese patent publication No. 6,712/1957 if the composition of the aqueous reaction material mixture, in terms of oxide mol ratios, falls within one of the following ranges:

|  | Range 1 | Range 2 |
| --- | --- | --- |
| $Na_2O/SiO_2$ | 0.6-60 | 1.2-1.5 |
| $SiO_2/Al_2O_3$ | 2-40 | 3-5 |
| $H_2O/Na_2O$ | 10-30 | 35-60 | zeolite G has been obtained. It is also disclosed in the specification of Japanese patent publication No. 3,659/1963 that, when the composition of the aqueous reaction material mixture, in terms of oxide mol ratios, falls within the following range:

$Na_2O/SiO_2$ ---- 1.2 to 1.5
$SiO_2/Al_2O_3$ ---- 3 to 5
$H_2O/Na_2O$ ---- 35 to 65 zeolite X has been obtained. It is also disclosed in the

Summarizing the above, the prior art patents teach that, from the aqueous reaction material mixture having a composition falling in the range in which $SiO_2/Al_2O_3$ is not more than 3 and the mol ratio of the $Na_2O/SiO_2$ is less than 0.7, zeolite A cannot be obtained. Only when kaolin is used as a silica and alumina source, will zeolite A low in the purity be obtained. The patent numbers and the compositions of the aqueous raw material mixtures are shown in Table 1.

TABLE 1

|  | Patent numbers | | |
| --- | --- | --- | --- |
|  | U.S. Patent No. 3,114,603 | U.S. Patent No. 3,119,660 | Belgian Patent No. 620,278 |
| $Na_2O/SiO_2$ | 0.5-1 | 0.5-1.5 | 0.5-1 |
| $SiO_2/Al_2O_3$ | 1-2.5 | 1.6-2.5 | 1-2.5 |
| $H_2O/Na_2O$ | 25-100 | 10-100 | 25-100 |

Further, it was believed that, if the range of $Na_2O/SiO_2$ is less than 0.7, no pure zeolite A can be obtained, and that no zeolite A can be obtained in case the range of the oxide mol ratio of $H_2O/Na_2O$ in the aqueous reaction material mixture is in excess of 200, except by the method disclosed in the Japanese patent publication No. 19,116/1961. However, it is mentioned therein that, only in case the ratio of $SiO_2/Al_2O_3$ is in an exceptionally high range of 4 to 6, pure zeolite will be obtained.

It is well known that it is essential in the production of zeolite that, in using a kaolin-type mineral as a silica and alumina source, the crystal structure of kaolin must be destroyed in advance. For example, it is mentioned in the specification of Japanese patent publication No. 5,806/1963 that kaolin must be fired at 600 to 800° C. in advance and in Japanese patent publication No. 5,054/1965 it is stated that it is an essential requirement to mechanically grind the kaolin in advance.

It is the principal object of this invention to provide a novel process for producing sodium zeolite A of high purity. A further object of the invention is to provide a novel process which utilizes a commercially economical starting material such as Allophane. Another object of the invention is to provide a novel process for producing sodium zeolite A having improved absorbing properties.

SUMMARY OF THE INVENTION

According to the invention, sodium zeolite A is prepared by the method, in the broadest scope, which comprises preparing an aqueous reactant mixture containing essentially oxides of silicon, aluminum and sodium, having a composition which, expressed in oxide mol ratios, falls within the following ranges:

|  | Range 1 | Range 2 | Range 3 | Range 4 |
| --- | --- | --- | --- | --- |
| $Na_2O/SiO_2$ | 0.4-0.7 | 0.4-0.7 | 0.7-1 | 1-4 |
| $SiO_2/Al_2O_3$ | 1-2 | 1-2.5 | 1-2.5 | 1-2.5 |
| $H_2O/Na_2O$ | 40-100 | 120-100 | 220-300 | 210-300 | maintaining the mixtures for reacting, digesting or crystallizing at a temperature within the range of from about 40° C. to about 180° C., preferably 40° C. to about 125° C., until the crystals of zeolite A will form, thereafter separating the crystals from the mixture and, if necessary, activating said crystals to remove at least a part of the water of hydration.

In producing sodium zeolite A, representative reactants are soluble sodium silicate, Allophane and other standard commercially available reactants such as sodium silicate, silica gels, silicic acid, aqueous colloidal silica sols and reactive amorphous solid silicas, as sources of silica. Alumina may be obtained from Allophane, active alumina, gamma alumina, alpha alumina, alumina trihydrate, or sodium aluminate. Sodium or sodium oxide may be supplied as sodium hydroxide or sodium silicate.

A preferred source of silica for producing high purity sodium zeolite A is soluble sodium silicate, Allophane or mixtures thereof.

When Allophane is employed as the major source of silica, high purity zeolite A may be obtained by preparing an aqueous reactant mixture having a composition, in terms of the oxide mol ratio, which falls within one of the following ranges:

|  | Range 1 | Range 2 | Range 3 | Range 4 |
| --- | --- | --- | --- | --- |
| $Na_2O/SiO_2$ | 0.4-0.7 | 0.4-0.7 | 0.7-1 | 1-4 |
| $SiO_2/Al_2O_3$ | 1-2 | 1-2.5 | 1-2.5 | 1-2.5 |
| $H_2O/Na_2O$ | 40-100 | 120-300 | 220-300 | 210-300 |

When soluble sodium silicate is employed as the major source of silica, high purity zeolite A is obtained by preparing an aqueous reactant mixture having a composition, expressed in terms of the oxide mol ratio, falling within any of the following ranges:

|  | Range 1 | Range 2 | Range 3 |
| --- | --- | --- | --- |
| $Na_2O/SiO_2$ | 0.4-0.7 | 0.7-1 | 1-4 |
| $SiO_2/Al_2O_3$ | 1-2.5 | 1-2.5 | 1-2.5 |
| $H_2O/Na_2O$ | 120-300 | 220-300 | 210-300 |

In accordance with the preferred method of the invention, high purity sodium zeolite A having an improved water adsorption capacity is prepared by processing, reacting, digesting or crystallizing the aqueous reactant mixture containing essentially oxides of silicon, aluminum and sodium in such proportions as heretofore specified and also containing soluble salts of heavy metal oxyacids, such as soluble bichromate (ex. sodium bichromate) and/or soluble permanganates (ex. sodium permanganate) and/or soluble vanadates (ex. sodium vanadate). The preferable proportion of such salts of oxyacids comprising oxide compounds of heavy metals is from about 0.01 to 5 weight percent, more preferably 0.05 to 1 weight percent, based on the total aqueous reactant mixture.

The preferred method, according to the invention, includes two steps of processing the aqueous reactant mixture. The first step is the step of reaction or digestion which is conducted in the temperature range of 40° C. to 60° C. for more than one hour, preferably from 6 to 30 hours. The second step is the step of crystallization in which sodium zeolite A is crystallized, being conducted in the temperature range of 80° C. to 125° C., preferably from 80° C. to 100° C. for 10 to 50 hours.

Allophene is an amorphous or colloidally amorphous inorganic substance naturally produced in the countries on the coasts of the Pacific Ocean and other countries, especially in volcanic countries. It shows substantially no X-ray diffraction pattern in general. Its refractive index is 1.477 to 1.55. It is mostly spherical and its diameter is 0.01 to 0.1μ in general. Its differential thermal analysis curve consists of a large endothermic peak between 100 and 200° C. and an exothermic peak between 900 and 1000° C. Chemically it has $SiO_2$, $Al_2O_3$ and $H_2O$ as its main constituents. The mol ratio of $SiO_2/Al_2O_3$ therein is generally 1 to 2. The mol ratio of $H_2O/Al_2O_3$ is generally 5. Further, it contains a small amount of $Fe_2O_3$ and other constituents which differ depending on the origin. Differences between Allophane and kaolin, which is a typical natural mineral so far used as an alumina and silica source for the synthesis of zeolite, are (1) whereas kaolin generally has a triclinic or monoclinic crystal structure, Allophane is an amorphous substance having no crystal structure, (2) whereas the refractive index of kaolin is 1.561 to 1.567, that of Allophane is 1.47 to 1.55 (3) whereas the differential thermal analysis curve of kaolin shows an endothermic peak at 400 C. and an exothermic peak at 930° C., that of Allophane shows an endothermic peak between 100 and 200° C. and an exothermic peak between 900 and 1000° C. (4) whereas kaolin has a hexagonal plate or fine tubular form, Allophane has a spherical form and (5) whereas the chemical composition of kaolin is represented by $$Al_2O_3 \cdot 2SiO_2 \cdot 2H_2O$$

that of Allophane is represented generally by $Al_2O_3 \cdot 1$ to $2SiO_2 \cdot 5H_2O$.

Allophane is mentioned, for example, in U.S. Geol. Survey Prof. Papers 18SG, 135–148 (1934).

An advantageous method of preparing an aqueous reaction mixture by using soluble sodium silicate as a main or major silica source is a method wherein an aqueous solution containing sodium hydroxide and aluminum hydroxide is prepared. The obtained solution is added while being stirred to an aqueous solution of sodium silicate, and if necessary, the solutions are mixed while being cooled. In case the aqueous reaction mixture has gelled so much as to be difficult to stir, it may be made easy to stir by crushing the gel. A typical method of preparing an aqueous reaction mixture by using Allophane as a main or major silica source is a method wherein untreated Allophane or heated and dried Allophane is mixed with the water and/or sodium silicate solution and/or silica gel-water mixture to form a slurry and a solution of sodium hydroxide is added to the slurry.

The preferred method, according to the invention, includes two steps of processing the aqueous reactant mixture. The first step is the stop of reaction or digestion which is conducted in the temperature range of 40° C. to 60° C. for more than one hour, preferably from 6 to 30 hours. The second step is the step of crystallization in which sodium zeolite B is crystallized. This stop is conducted in the temperature range of 80° C. to 125° C., preferably from 80° C. to 100° C. for 10 to 50 hours.

Suitable heating devices to be used for the reaction or digestion or crystallization of an aqueous reaction material mixture are furnaces, sand baths, oil baths or jacketed autoclaves, and other conventional devices.

The crystals of zeolite are obtained by separating the produced crystals from the mother liquor by a conventional process such as, for example, a filtration or centrifugal separation and are then washed and dried.

The drying may be carried out, for example, in circulated air or by heating in a furnace at 25 to 150° C. In order to determine the adsorption characteristics of the above-mentioned products, it is necessary to activate or dehydrate this zeolite as mentioned below. During the aging or development of the crystals, it is not necessary to strongly stir this aqueous reaction mixture. In fact, without stirring satisfactory results will be obtained.

When the zeolite obtained by the method of the present invention is activated or dehydrated, it will come to have a special molecular sieve property. In order to activate or dehydrate it, it may be heated, for example, in air, vacuum or any other appropriate gas. It can be activated at a temperature, for example, of 250 to 700° C.

The effect of the present invention is that it is possible to produce zeolite A high in the purity and quality under the conditions in a range in which it was previously considered impossible to obtain zeolite A high in the purity.

Another effect of the present invention brought about by using Allophane is that, because Allophane is an amorphous inorganic substance, the raw material can be subjected to the reaction without requiring the operation of destroying the crystal structure by heating or mechanically grinding as in the conventional method in which kaolin or the like is used as a raw material.

Further, the particular effect of reacting, digesting or crystallizing in the presence of the heavy metal oxyacid salt, such as a bichromate salt, appears, for example, in the remarkable increase of the adsorption efficiency. In such case, in fact, no residue of the heavy metal oxyacid can be recognized in the product and no variation in X-ray powder diffraction pattern can be recognized.

INCORPORATION BY REFERENCE

Pursuant to the Commissioner's Notice dated Jan. 15, 1969 (34 Fed. Reg. 883), there is incorporated by reference colum 8, line 25 through column 17, line 20 of U.S. Pat. No. 3,535,075, containing Examples 1 through 16.

EXAMPLE 17

11.8 grams of sodium hydroxide were dissolved in a small amount of water. The solution was heated to near its boiling point and 33 grams of aluminum hydroxide were added thereto. After a further heating for seven minutes, further water was added to make the solution 350 grams.

82.4 grams of sodium silicate (9.26% $Na_2O$, 29.12%  $SiO_2$) were diluted with 352 grams of water. Both of these obtained solutions were cooled in an ice bath, and said solution of sodium hydroxide and aluminum hydroxide was added to said sodium solution under stirring.

The composition of the obtained aqueous reactant mixture, in terms of oxide mol ratios, was:

$Na_2O/SiO_2$ ---------------------------------- 0.65
$SiO_2/Al_2O_3$ ---------------------------------- 2.0
$H_2O/Na_2O$ ---------------------------------- 150

This aqueous reactant mixture solidified soon to a gel, thus making stirring difficult. Therefore, said gel-like mixture was crushed to make stirring easy and it was stirred and digested at about 50° C. to 60° C. for a period of about eight hours, then the temperature was increased to 100° C., and the mixture was stirred and maintained at said temperature for a period of 20 hours for developing and aging the crystals.

At the end of the second step the solid product was filtered, washed and dried.

The resultant product shows an X-ray powder diffraction pattern shown in the following Table 6.

TABLE 6

| $d$ (A.): | Relative intensity |
|---|---|
| 12.44 | M |
| 8.84 | W |
| 7.19 | W |
| 5.45 | M |
| 4.111 | M |
| 3.720 | S |
| 3.411 | W |
| 3.300 | S |
| 2.986 | S |
| 2,635 | W |
| 2.342 | VW |

Further, the chemical analysis indicates a product composition of 0.89 $Na_2O_3 \cdot Al_2O_3 \cdot 2.13\ SiO_2 \cdot 2.12\ H_2O$.

From these results the obtained product was identified as sodium zeolite A.

The water adsorption capacity, determined by the same method as described in Example 1, was 16.6%.

EXAMPLE 18

16.5 grams of sodium hydroxide were dissolved in a small amount of water. The solution was heated to near its boiling point and 16.5 grams of aluminum hydroxide were added thereto. After a further heating for seven minutes, further water was added to make the total solution 580 grams. 34.5 grams of sodium silicate (9.26% $Na_2O$, 29.12% $SiO_2$) was diluted with 500 grams of water. Both of these solutions were cooled in an ice bath and said solution of sodium hydroxide and aluminum hydroxide was added to said sodium silicate solution under stirring.

The composition of the aqueous reactant mixture, in terms of oxide mol ratios, was:

$Na_2O/SiO_2$ ---------------------------------- 1.5
$SiO_2/Al_2O_3$ --------------------------------- 1.7
$H_2O/Na_2O$ ---------------------------------- 240

This aqueous reactant mixture was stirred until it became a homogeneous gel.

It was stirred and digested at about 50° C. to 60° C. for a period of about 11.5 hours, then the temperature was increased to 100° C., and the mixture was stirred and maintained at said temperature for a period of 28 hours for developing and aging the crystals.

At the end of the second step the solid product was filtered, washed and dried.

The resultant product shows the X-ray powder diffraction pattern shown in the following Table 7.

TABLE 7

| $d$(A.): | Relative intensity |
|---|---|
| 12.27 | VS |
| 8.75 | M |
| 7.13 | M |
| 5.50 | M |
| 4.10 | S |
| 3.720 | S |
| 3.411 | W |
| 3.288 | S |
| 2.986 | VS |
| 2.901 | W |
| 2.753 | M |
| 2.688 | W |
| 2.635 | S |
| 2.513 | VW |
| 2.460 | VW |

Further, the chemical analysis indicates a product composition of 0.97 $Na_2O \cdot Al_2O_3 \cdot 1.92\ SiO_2 \cdot 2.99\ H_2O$.

From these results the obtained product was identified as sodium zeolite A.

The water adsorption capacity determined by the same method as described in Example 1, was 18.0%.

EXAMPLE 19

33.2 grams of sodium hydroxide was dissolved in a small amount of water. The solution was heated to near its boiling point and 39.7 grams of aluminum hydroxide were added thereto. After a further heating for seven minutes, further water was added to make the total solution 1192 grams.

83 grams of sodium silicate (9.26% $Na_2O$, 29.12% $SiO_2$) were diluted with 100 grams of water. Both of these solutions were cooled in an ice bath and said solution of sodium hydroxide and aluminum hydroxide was added to said sodium silicate solution under stirring.

The composition of the aqueous reactant mixture, in terms of oxide mol ratios, was:

$Na_2O/SiO_2$ ---------------------------------- 1.26
$SiO_2/Al_2O_3$ --------------------------------- 1.27
$H_2O/Na_2O$ ---------------------------------- 240

This aqueous reactant mixture was stirred until it became a homogeneous gel. It was stirred and digested at about 50° C. to 60° C. for a period of about six hours, then the temperature was increased to 100° C., and the mixture was stirred and maintained at said temperature for a period of 43 hours for developing and aging the crystals.

At the end of the second step the solid product was filtered, washed and dried.

The resultant product shows the X-ray powder diffraction pattern shown in the following Table 8.

TABLE 8

| $d$ (A.): | Relative intensity |
|---|---|
| 12.44 | VS |
| 8.75 | M |
| 7.13 | M |
| 5.53 | M |
| 5.03 | VW |
| 4.35 | VW |
| 4.111 | M |
| 3.720 | VS |
| 3.424 | W |
| 3.300 | VS |
| 2.986 | VS |
| 2.910 | W |
| 2.753 | W |
| 2.696 | W |
| 2.627 | M |
| 2.513 | VW |
| 2.453 | VW |
| 2.372 | VW |

Further, the chemical analysis indicates a product composition of 0.93 $Na_2O \cdot Al_2O_3 \cdot 1.98\ SiO_2 \cdot 3.42\ H_2O$.

From those results the product was identified as sodium zeolite A.

The water adsorption capacity, determined by the same method described in Example 1, was 15.9%.

EXAMPLE 20

16.4 grams of sodium hydroxide were dissolved in a small amount of water. The solution was heated to near its boiling point and 38.3 grams of aluminum hydroxide were added thereto. After a further heating for seven minutes, further water was added to make the total solution 498 grams.

80 grams of sodium silicate (9.26% $Na_2O$, 29.12% $SiO_2$) were diluted with 900 grams of water. Both of these solutions were cooled in an ice bath and said solution of sodium hydroxide and aluminum hydroxide was added to said sodium silicate solution under stirring.

The composition of the aqueous reactant mixture, in terms of oxide mol ratios, was:

$Na_2O/SiO_2$ ---------------------------------- 0.8
$SiO_2/Al_2O_3$ --------------------------------- 1.7
$H_2O/Na_2O$ ---------------------------------- 250

11

This aqueous reactant mixture was stirred until it became a homogeneous gel. It was stirred and digested at about 50° C. to 60° C. for a period of about eight hours, then the temperature was increased to 100° C., and the mixture was stirred and maintained at said temperature for a period of 25 hours for developing and aging the crystals:

At the end of the second step the solid product was filtered, washed and dried.

The resultant crystals show an X-ray diffraction pattern and a composition by chemical analysis substantially the same as those of the crystals obtained in Example 17. It was identified as sodium zeolite A.

Further, the water adsorption capacity of said crystals was the same as the crystals obtained in Example 17.

EXAMPLE 21

11.8 grams of sodium hydroxide were dissolved in a small amount of water. The solution was heated to near its boiling point and 33 grams of aluminum hydroxide and 1 gram of potassium bichromate were added thereto. After a further heating for seven minutes, further water was added to make the total solution 350 grams. On the other hand 82.4 grams of sodium silicate (9.26% $Na_2O$, 29.12% $SiO_2$) were diluted with 352 grams of water.

Both of these solutions were cooled in an ice bath and said solution of sodium hydroxide and aluminum hydroxide was added to said sodium silicate solution under stirring.

The composition of the aqueous reactant mixture, in terms of oxide mol ratios, was:

$Na_2O/SiO_2$ _____ 0.65
$SiO_2OAl_2O_3$ _____ 2.0
$H_2O/Na_2O$ _____ 150

This aqueous reactant mixture solidified soon to a gel, thus making stirring difficult. Therefore, said gel-like mixture was crushed to make stirring easy and it was stirred and digested at about 50° C. to 60° C. for a period of about eight hours, then the temperature was increased to 100° C., and the mixture was stirred and maintained at said temperature for a period of 20 hours for developing and aging the crystals.

At the end of the second step the solid product was filtered, washed and dried.

The resultant crystals show an X-ray powder diffraction pattern and a composition by chemical analysis substantially the same as those of the crystals obtained in Example 17 and there was found no evidence that potassium bichromate exists in the crystalline structure. The obtained crystals were identified as sodium zeolite A.

The water adsorption capacity, determined by the same method as described in Example 1, was 24.8%.

EXAMPLE 22

11.8 grams of sodium hydroxide were dissolved in a small amount of water. The solution was heated to near its boiling point and 33 grams of aluminum hydroxide and 1 gram of sodium permanganate were added thereto. After further heating for seven minutes, further water was added to make the total solution 350 grams. 82.4 grams of sodium silicate (9.26% $Na_2O$, 29.12% $SiO_2$) were diluted with 352 grams of water.

The composition of the aqueous reactant mixture, in terms of oxide mol ratios, was:

$Na_2O/SiO_2$ _____ 0.61
$SiO_2/Al_2O_3$ _____ 2.0
$H_2O/Na_2O$ _____ 150

At the end of the second step the solid product was filtered, washed and dried.

The resultant crystals show an X-ray powder diffraction pattern and a composition by chemical analysis substantially the same as those of the crystals obtained in Example 17 and there was found no evidence that sodium permanganate exists in the crystalline structure. The obtained crystals were identified as sodium zeolite A.

The water adsorption capacity, determined by the same method as described in Example 1, was 24.3%.

EXAMPLE 23

11.8 grams of sodium hydroxide were dissolved in a small amount of water. The solution was heated to near its boiling point and 33 grams of aluminum hydroxide and 1 gram of sodium vanadate were added thereto. After a further heating for seven minutes, further water was added to make the total solution 350 grams. 82.4 grams of sodium silicate (9.26% $Na_2O$, 29.12% $SiO_2$) were diluted with 352 grams of water.

The composition of the aqueous reactant mixture, in terms of oxide mol ratios, was:

$Na_2O/SiO_2$ _____ 0.65
$SiO_2/Al_2O_3$ _____ 2.0
$H_2O/Na_2O$ _____ 150

At the end of the second step the solid product was filtered, washed and dried.

The resultant crystals show an X-ray powder diffraction pattern and a composition by chemical analysis substantially the same as those of the crystals obtained in Example 17 and there was found no evidence that sodium vanadate exists in the crystalline structure. The obtained crystals were identified as sodium zeolite A.

The water adsorption capacity, determined by the same method as described in Example 1, was 25.2%.

EXAMPLE 24

16.5 grams of sodium hydroxide were dissolved in a small amount of water. The solution was heated to near its boiling point and 16.5 grams of aluminum hydroxide and 1 gram of sodium bichromate were added thereto. After further heating for seven minutes, further water was added to make the total solutiotn 580 grams. 34.5 grams of sodium silicate (9.26% $Na_2O$, 29.12% $SiO_2$) were diluted with 500 grams of water.

The composition of the aqueous reactant mixture, in terms of oxide mol ratios, was:

$Na_2O/SiO_2$ _____ 1.5
$SiO_2/Al_2O_3$ _____ 1.7
$H_2O/Na_2O$ _____ 240

This aqueous reactant mixture was stirred until it became uniform gel-like material and it was stirred and digested at about 50° C. to 60° C. for a period of about 11.5 hours, then temperature was increased to 100° C., and the mixture was stirred and maintained at said temperature for a period of 28 hours for developing and aging the crystals.

At the end of the second step the solid product was filtered, washed and dried.

The resultant crystals show an X-ray powder diffraction pattern and a composition by chemical analysis substantially the same as those of the crystals obtained in Example 18. There was found no evidence that sodium bichromate exists in the crystalline structure. The obtained crystals were identified as sodium zeolite A.

The water adsorption capacity, determined by the same method as described in Example 1, was 25.7%.

EXAMPLE 25

16.5 grams of sodium hydroxide were dissolved in a small amount of water. The solution was heated to near its boiling point and 16.5 grams of aluminum hydroxide and 1 gram of sodium permanganate were added thereto. After further heating for seven minutes, futher water was added to make the total solution 580 grams. 34.5 grams of sodium silicate (9.26% $Na_2O$, 29.12% $SiO_2$) were diluted with 500 grams of water.

The composition of the aqueous reactant mixture, in terms of oxide mol ratios, was:

NaO/SiO$_2$ ------------------------------------ 1.5
SiO$_2$Al$_2$O$_3$ -------------------------------- 1.7
H$_2$O/Na$_2$O ------------------------------------ 240

This aqueous reactant mixture was stirred until it became a uniform gel-like material and it was stirred and digested at about 50° C. to 60° C. for a period of about 11.5 hours. The temperature was increased to 100° C., and the mixture was stirred and maintained at said temperature for a period of 28 hours for developing and aging the crystals.

At the end of the second step the solid product was filtered, washed and dried.

The resultant crystals show an X-ray powder diffraction pattern and a composition by chemical analysis substantially the same as those of the crystals obtained in Example 18. There was found no evidence that sodium permanganate exists in the crystalline structure. The obtained crystals were identified as sodium zeolite A.

The water adsorption capacity, determined by the same method as described in Example 1, was 26.2%.

EXAMPLE 26

16.5 grams of sodium hydroxide were dissolved in a small amount of water. The solution was heated to near its boiling point and 16.5 grams of aluminum hydroxide and 1 gram of sodium vanadate were added thereto. After a further heating for seven minutes, further water was added to make the total solution 580 grams. 34.5 grams of sodium silicate (9.26% of Na$_2$O, 29.12% of SiO$_2$) were diluted with 500 grams of water.

The composition of the aqueous reactant mixture, in terms of oxide mol ratios, was:

Na$_2$O/SiO$_2$ ----------------------------------- 1.2
SiO$_2$/Al$_2$O$_3$ -------------------------------- 1.7
H$_2$O/Na$_2$O ------------------------------------ 240

This aqueous reactant mixture was stirred until it became uniform gel-like material and it was stirred at about 50° C. to 60° C. for a period of about 11.5 hours. Then the temperature was increased to 100° C., and the mixture was stirred and maintained at said temperature for a period of 28 hours for developing and aging the crystals.

At the end of the second step the solid product was filtered, washed and dried.

The resultant crystals show an X-ray powder diffraction pattern and a composition by chemical analysis substantially the same as those of tie crystals obtained in Example 18. There was found no evidence that sodium vanadate exists in the crystalline structure. The obtained crystals were identified as sodium zeolite A.

The water adsorption capacity, determined by the same method as described in Example 1, was 26.0%.

EXAMPLE 27

33.2 grams of sodium hydroxide were dissolved in a small amount of water. The solution was heated to near its boiling point and 39.7 grams of aluminum hydroxide and 1 gram of potassium bichromate were added thereto. After further heating for seven minutes, water was added to make the total solution 1192 grams. 83 grams of sodium silicate (9.26% Na$_2$O, 29.12% SiO$_2$) were diluted with 1000 grams of water.

The composition of the aqueous reactant mixture, in terms of oxide mol ratios, was:

Na$_2$O/SiO$_2$ ---------------------------------- 1.26
SiO$_2$/Al$_2$O$_3$ ------------------------------- 1.71
H$_2$O/Na$_2$O ----------------------------------- 240

This aqueous mixture was stirred until it became a uniform gel-like material and iit was stirred and digested at about 50° C. to 60° C. for a period of about six hours. The temperature was increased to 100° C., and the mixture was stirred and maintained at said temperature for a period of 43 hours for developing and aging the crystals.

At the end of the second step the solid product was filtered, washed and dried.

The resultant crystals show an X-ray powder diffraction pattern and a composition by chemical analysis substantially the same as those of the crystals obtained in Example 19. There was found no evidence that potassium bichromate exists in the crystalline structure. The obtained crystals were identified as sodium zeolite A.

The water adsorption capacity, determined by the same method as described in Example 1, was 25.9%.

EXAMPLE 28

33.2 grams of sodium hydroxide were dissolved in a small amount of water. The solution was heated to near its boiling point and 39.7 grams of aluminum hydroxide and 1 gram of sodium permaganate were added thereto. After further heating for seven minutes, water was added to make the total solution 1192 grams. 83 grams of sodium silicate (9.26% Na$_2$O, 29.12% SiO$_2$) were diluted with 1000 grams of water.

The composition of the aqueous mixture, in terms of oxide mol ratios, was:

Na$_2$O/SiO$_2$ ---------------------------------- 1.26
SiO$_2$/Al$_2$O$_3$ ------------------------------- 1.71
H$_2$O/Na$_2$O$_3$ ------------------------------- 240

This aqueous reactant mixture was stirred until it became a uniform gel-like material and it was stirred and digested at about 60° C. for a period of about six hours. The temperature was increased to 100° C., and the mixture was stirred and maintained at said temperature for a period of 43 hours for developing and aging the crystals.

At the end of the second step the solid product was filtered, washed and dried.

The resultant crystals show an X-ray powder diffraction pattern and a composition by chemical analysis substantially the same as those of the crystals obtained in Example 19. There was found no evidence that sodium permanganate exists in the crystallne structure. The obtained crystals were identified as sodium zeolite A.

The water adsorption capacity, determined by the same method as described in Example 1, was 26.4%.

EXAMPLE 29

33.2 grams of sodium hydroxide were dissolved in a small amount of water. The solution was heated to near its boiling point and 39.7 grams of aluminum hydroxide and 1 gram of sodium vanadate were added thereto. After further heating for seven minutes, water was added to make the total solution 1192 grams. 83 grams of sodium silicate (9.26% Na$_2$O, 29.12% SiO$_2$) were diluted with 1000 grams of water.

The composition of the aqueous reactant mixture, in terms of oxide mol ratios, was:

Na$_2$O/SiO$_2$ ---------------------------------- 1.26
SiO$_2$/Al$_2$O$_3$ ------------------------------- 1.71
H$_2$O/Na$_2$O ----------------------------------- 240

This aqueous reactant mixture was stirred until it became a uniform gel-like material and it was stirred and digested at about 50° C. to 60° C. for a period of about six hours. Then the temperature was increased to 100° C., and the mixture was stirred and maintained at said temperature for a period of 43 hours for developing and aging the crystals.

At the end of the second step the solid product was filtered, washed and dried.

The resultant crystals show an X-ray powder diffraction pattern and a composition by chemical analysis substantially the same as those of the crystals obtained in Example 19. There was found no evidence that sodium vanadate exists in the crystalline structure. The obtained crystals were identified as sodium zeolite A.

The water adsorption capacity, determined by the same method as described in Example 1, was 25.4%.

EXAMPLE 30

16.4 grams of sodium hydroxide were dissolved in a small amount of water. The solution was heated to near its boiling point and 38.3 grams of aluminum hydroxide and 1 gram of potassium bichromate were added thereto. After further heating for seven minutes, water was added to make the total solution 498 grams. 80 grams of sodium silicate (9.26% Na$_2$O, 29.12% SiO$_2$) were diluted with 900 grams of water.

The composition of the aqueous reactant mixture, in terms of oxide mol ratios, was:

Na$_2$O/SiO$_2$ --------------------------------- 0.8
SiO$_2$/Al$_2$O$_3$ ----------------------------- 1.7
H$_2$O/Na$_2$O --------------------------------- 250

This aqueous reactant mixture was stirred until it became a uniform gel-like material and it was stirred and digested at about 50° C. to 60° C. for a period of about 18 hours. The temperature was increased to 100° C., and the mixture was stirred and maintained at said temperature for a period of 25 hours for developing and aging the crystals.

At the end of the second step the solid product was filtered, washed and dried.

The resultant crystal shows an X-ray powder diffraction pattern and a composition by chemical analysis substantially the same as those of the crystals obtained in Example 20. There was found no evidence that potassium bichromate exists in the crystalline structure. The obtained crystals were identified as sodium zeolite A.

The water adsorption capacity, determined by the same method as described in Example 1, was 24.7%.

EXAMPLE 31

16.4 grams of sodium hydroxide were dissolved in a small amount of water. The solution was heated to near its boiling point and 38.3 grams of aluminum hydroxide and 1 gram of sodium permanganate were added thereto. After further heating for 7 minutes, water was added to make the total solution 498 grams. 80 grams of sodium silicate (9.26% Na$_2$O, 29.12% SiO$_2$) were diluted with 900 grams of water.

The composition of the aqueous reactant mixture, in terms of oxide mol ratios, was:

Na$_2$O/SiO$_2$ --------------------------------- 0.8
SiO$_2$/Al$_2$O$_3$ ----------------------------- 1.7
H$_2$O/Na$_2$O --------------------------------- 250

This aqueous reactant mixture was stirred until it became a uniform gel-like material and it was stirred and digested at about 50° C. to 60° C. for a period of about eight hours. The temperature was increased to 100° C., and the mixture was stirred and maintained at said temperature for a period of 25 hours for developing and aging the crystals.

At the end of the second step the solid product was filtered, washed and dried.

The resultant crystal shows an X-ray powder diffraction pattern and a composition by chemical analysis substantially the same as those of the crystals obtained in Example 20. There was found no evidence that sodium permnganate exists in the crystalline structure. The obtained crystals were identified as sodium zeolite A.

The water adsorption capacity, determined by the same method as described in Example 1, was 24.5%.

EXAMPLE 32

16.4 grams of sodium hydroxide were dissolved in a small amount of water. The solution was heated to near its boiling point and 38.3 grams of aluminum hydroxide and 1 gram of sodium vanadate were added thereto. After further heating for seven minutes, water was added to make the total solution 498 grams. 80 grams of sodium silicate (9.26% Na$_2$O, 29.12% SiO$_2$) were diluted with 900 grams of water.

The composition of the aqueous reactant mixture, in terms of oxide mol ratios, was:

Na$_2$O/SiO$_2$ --------------------------------- 0.8
SiO$_2$/Al$_2$O$_3$ ----------------------------- 1.7
H$_2$O/Na$_2$O --------------------------------- 250

This aqueous mixture was stirred until it became a uniform gel-like material and it was stirred and digested at about 50° C. to 60° C. for a period of about eight hours. The temperature was increased to 100° C., and the mixture was stirred and maintained at said temperature for a period of 25 hours for developing and aging the crystals.

At the end of the second step the solid product was filtered, washed and dried.

The resultant crystals show an X-ray powder diffraction pattern and a composition by chemical analysis substantially the same as those of the crystals obtained in Example 20. There was found no evidence that sodium vanadate exists in the crystalline structure. The obtained crystals were identified as sodium zeolite A.

The water adsorption capacity, determined by the same method as described in Example 1, was 25.0%.

INCORPORATION BY REFERENCE

Pursuant to the Commissioner's Notice dated Jan. 15, 1969 (34 Fed. Reg. 883), there is incorporated by reference column 25, line 5 through column 29, line 71 of U.S. Pat. No. 3,535,075, containing comparative Experiments 1 through 9.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. A process for preparing sodium zeolite A which comprises preparing an aqueous sodium-alumino-silicate reactant mixture consisting essentially of (1) oxides of silicon, aluminum and sodium, (2) water, in proportions, expressed in terms of oxide mol ratios, falling within the following ranges:

| Range | 1 | 2 | 3 |
|---|---|---|---|
| Na$_2$O/SiO$_2$ | 0.4–0.7 | 0.7–1 | 1–4 |
| SiO$_2$/Al$_2$O$_3$ | 1–2.5 | 1–2.5 | 1–2.5 |
| H$_2$O/Na$_2$O | 120–300 | 220–300 | 210–300 | wherein the major source of silica in the reactant mixture is soluble sodium silicate, and (3) a soluble salt of a heavy metal oxyacid in an amount within the range of about 0.01 to 5 weight percent based on the total weight of the reacant mixture, maintaining the reactant mixture at a temperature within the range of 40° C. to 180° C. for a sufficient period to crystallize sodium zeolite A, and separating the crystals from the mother liquor.

2. A process for preparing sodium zeolite A which comprises preparing an aqueous sodium-alumino-silicate reactant mixture consisting essentially of (1) oxides of silicon, aluminum and sodium, (2) water, in proportions, expressed in terms of oxide mol ratios, falling within the following ranges:

| Range | 1 | 2 | ε |
|---|---|---|---|
| Na$_2$O/SiO$_2$ | 0.4–0.7 | 0.7–1 | 1–4 |
| SiO$_2$/Al$_2$O$_3$ | 1–2.5 | 1–2.5 | 1–2.5 |
| H$_2$O/Na$_2$O | 120–300 | 220–300 | 210–300 | wherein the major source of silica in the reactant mixture is soluble sodium silicate and (3) soluble bichromate in an amount of 0.01 to 5 percent of the weight of the aqueous reactant mixture, maintaining the reactant mixture at a temperature within the range of 40° C. to 180° C. for a sufficient period to crystallize sodium zeolite A, and separating the crystals from the mother liquor.

3. A process for preparing sodium zeolite A according to claim 2, wherein the reactant mixture is maintained at a temperature within the range of 40° C. to 60° C. for a period of at least one hour, thereafter maintaining the reactant mixture at a temperature within the range of 80° C. to 125° C. for a sufficient period to crystallize sodium zeolite A, and separating the crystals from the mother liquor.

4. A process for preparing sodium zeolite A which comprises preparing an aqueous sodium-alumina-silicate reactant mixture consisting essentially of (1) oxides of silicon, aluminum and sodium, (2) water, in proportions, expressed in terms of oxide mol ratios, falling within the following ranges:

| Range | 1 | 2 | 3 |
|---|---|---|---|
| $Na_2O/SiO_2$ | 0.4–0.7 | 0.7–1 | 1–4 |
| $SiO_2/Al_2O_3$ | 1–2.5 | 1–2.5 | 1–2.5 |
| $H_2O/Na_2O$ | 120–300 | 220–300 | 210–300 | wherein the major source of silica in the reactant mixture is soluble sodium silicate and (3) soluble permanganate in an amount of 0.01 to 5 percent of the weight of the aqueous reactant mixture, maintaining the reactant mixture at a temperature within the range of 40° C. to 180° C. for a sufficient period to crystallize sodium zeolite A, and separating the crystals from the mother liquor.

5. A process for preparing sodium zeolite A according to claim 4, wherein the reactant mixture is maintained at a temperature within the range of 40° C. to 60° C. for a period of at least one hour, thereafter maintaining the reactant mixture at a temperature within the range of 80° C. to 125° C. for a sufficient period to crystallize sodium zeolite A, and separating the crystals from the mother liquor.

6. A process for preparing sodium zeolite A which comprises preparing an aqueous sodium-alumino-silicate reactant mixture consisting essentially of (1) oxides of silicon, aluminum and sodium, (2) water, in proportions, expressed in terms of oxide mol ratios, falling within the following ranges:

| Range | 1 | 2 | 3 |
|---|---|---|---|
| $Na_2O/SiO_2$ | 0.4–0.7 | 0.7–1 | 1–4 |
| $SiO_2/Al_2O_3$ | 1–2.5 | 1–2.5 | 1–2.5 |
| $H_2O/Na_2O$ | 120–300 | 220–300 | 210–300 | wherein the major source of silica in the reactant mixture is soluble sodium silicate and (3) soluble vanadate in an amount of 0.01 to 5 percent of the weight of the aqueous reactant mixture, maintaining the reactant mixture at a temperature within the range of 40° C. to 180° C. for a sufficient period to crystallize sodium zeolite A, and separating the crystals from the mother liquor.

7. A process for preparing sodium zeolite A according to claim 6, wherein the reactant mixture is maintained at a temperature within the range of 40° C. to 60° C. for a period of at least one hour, thereafter maintaining the reactant mixture at a temperature within the range of 80° C. to 125° C. for a sufficient preiod to crystallize sodium zeolite A, and separating the crystals from the mother liquor.

References Cited
UNITED STATES PATENTS

| 2,882,243 | 4/1959 | Milton | 23—113 |
| 2,982,612 | 5/1961 | Barber et al. | 23—113 |
| 2,847,280 | 8/1958 | Estes | 23—113 |

EDWARD J. MEROS, Primary Examiner